United States Patent
Markedal et al.

(10) Patent No.: US 10,292,406 B2
(45) Date of Patent: *May 21, 2019

(54) PROCESS FOR THE MANUFACTURE OF A PRODUCT FROM A PLANT MATERIAL

(71) Applicant: Kobenhavns Universitet, Copenhagen K (DK)

(72) Inventors: Keld Ejdrup Markedal, Holbaek (DK); Jens Christian Sorensen, Brondby Strand (DK); Hilmer Sorensen, Brondby Strand (DK); Anne Dorthe Sorensen, Brondby Strand (DK)

(73) Assignee: Kobenhavns Universitet, Copenhagen K (DK)

( * ) Notice: Subject to any disclaimer, the term of this patent is extended or adjusted under 35 U.S.C. 154(b) by 221 days.

This patent is subject to a terminal disclaimer.

(21) Appl. No.: 15/280,120

(22) Filed: Sep. 29, 2016

(65) Prior Publication Data

US 2017/0013859 A1    Jan. 19, 2017

Related U.S. Application Data

(63) Continuation of application No. 14/002,604, filed as application No. PCT/DK2012/050067 on Mar. 1, 2012, now Pat. No. 9,491,958.

(30) Foreign Application Priority Data

Mar. 1, 2011 (DK) .................. 2011 70106

(51) Int. Cl.
*A23J 1/14* (2006.01)
*A23L 11/30* (2016.01)
(Continued)

(52) U.S. Cl.
CPC ................ *A23J 1/14* (2013.01); *A23L 11/34* (2016.08); *A23L 11/35* (2016.08); *A23L 33/185* (2016.08);
(Continued)

(58) Field of Classification Search
None
See application file for complete search history.

(56) References Cited

U.S. PATENT DOCUMENTS 4,697,004 A    9/1987 Puski et al.
6,335,044 B1    1/2002 Wasche et al.
(Continued)

FOREIGN PATENT DOCUMENTS

EP    1 323 353 A1    7/2003
EP    1 528 068 A1    5/2005
(Continued)

*Primary Examiner* — Elizabeth Gwartney
(74) *Attorney, Agent, or Firm* — Sughrue Mion, PLLC

(57) ABSTRACT

A process for the manufacture of a product from a plant material comprising the steps of providing a disrupted plant material comprising <10% (w/w) starch and <10% (w/w) oil/lipids; adjusting the pH of the disrupted plant material to a value of pH 3.5 or below to provide an acidic suspension; heating the acidic suspension to a temperature in the range of about 50° C. to about 80° C.; isolating the product from the heated, acidic suspension. The product may be a protein product or a non-protein product. In particular, the process of the invention provides a protein product with reduced contents of non-protein components of negative nutritional value.

23 Claims, 4 Drawing Sheets

(51) Int. Cl.
 *A23L 33/185* (2016.01)
 *B01D 15/36* (2006.01)
(52) U.S. Cl.
 CPC ......... *B01D 15/362* (2013.01); *B01D 15/363* (2013.01); *A23V 2002/00* (2013.01)

(56) References Cited

U.S. PATENT DOCUMENTS

2008/0226810 A1 9/2008 Passe et al.
2010/0063254 A1 3/2010 Lotz et al.

FOREIGN PATENT DOCUMENTS

| WO | 03/043438 A1 | 5/2003 |
| WO | 2005/094603 A1 | 10/2005 |
| WO | 2008/049385 A1 | 5/2008 |
| WO | 2008/144939 A1 | 12/2008 |
| WO | 2010/006621 A1 | 1/2010 |

PROCESS FOR THE MANUFACTURE OF A PRODUCT FROM A PLANT MATERIAL

CROSS REFERENCE TO RELATED APPLICATIONS

This is a continuation of U.S. application Ser. No. 14/002,604 filed Oct. 11, 2013, which is a National Stage of International Application No. PCT/DK2012/050067, filed Mar. 1, 2012, claiming priority based on Denmark Patent Application No. PA 2011 70106, filed Mar. 1, 2011, the contents of all of which are incorporated herein by reference in their entirety.

FIELD OF THE INVENTION

This invention relates to processes for the manufacture of a product from a plant material. The product may be a protein product or a non-protein product. The processes of the invention provide plant products of use in the animal feeds, non-food products or for human consumption. Non-food products include adhesives, paint, etc. In particular, the protein products have reduced contents of non-protein components of negative nutritional value.

PRIOR ART

Processes for the production of plant products, e.g. protein isolates or concentrates or the like, are well known in the prior art. Such plant products are commonly used for animal feeds although they may also be used for human consumption or other purposes. In addition to nutritionally valuable components many plants also comprise components of negative nutritional value. Components of plant material may have negative nutritional value because they decrease the digestibility of an animal feed, or these components may generally inhibit the digestive system, or specific functions of the metabolism system in humans and animals. Some components may even possess an inherent toxicity.

Many plants contain too high levels of hydrolase or protease inhibitors, the removal of which is considered beneficial for e.g. a protein product to be used in an animal feed. Protease inhibitors, e.g. trypsin inhibitors, are found in most of legumes but they are also present in potatoes. Protease inhibitors are commonly small sized hydrophilic proteins of high solubility that may be glycosylated. They may therefore be difficult to precipitate, but they can normally be partly heat inactivated. Protease inhibitors tend to follow soluble protein in the processing of plant material.

A significant proportion of a plant material will be made up of variously sized polymers of sugars. Thus, for example a plant material may comprise oligo- and polysaccharides which may be found as soluble or insoluble fibres. One example of a soluble fibre is the raffinose family oligosaccharides. The raffinose family oligosaccharides includes the compounds raffinose, stachyose, verbascose, and ajugose. They are found in all legumes and to a minor extent in potatoes. They are neutral compounds, which may be separated from a solution using membrane filtration, such as ultra- or nanofiltration.

Saponins are neutral or anionic compounds that tend to follow the proteins during purification processes. The solubility of saponins is relatively high, although they may precipitate along with the proteins. It is of interest to be able to separately isolate the saponins when processing plant material so that their presence in final products can be strongly reduced or avoided if desired. The effects of saponins vary from causing unacceptable, e.g. bitter, taste to being toxic.

Phytate is a common component of plant material having negative nutritional value, since it may inter alia reduce the bioavailability of various minerals. The negative nutritional value of phytate is especially pronounced for non-ruminant animals. Phytate is highly negatively charged and may to a certain extent be extracted from the protein matrices of plants using a mechanical treatment of the plant cell walls in combination with low pH, which makes the cell wall swell. In general, the solubility of phytate is high at low pH, e.g. below 5.

Alkaloids and heteroaromatics are low molecular weight nitrogen containing compounds found too high concentrations in many plants, and these may be toxic. For example, lupine seeds represent one type of plant material of legume origin comprising toxic alkaloids. Alkaloids are neutral compounds and they may be removed from a plant material using ultra- or nanofiltration or by adsorption to a hydrophobic material such as hydrophobic column materials. They can also be removed by use of activated carbon.

Glycoalkaloids are glycosylated alkaloids compounds present in plants, such as potatoes. Glycoalkaloids may have a bitter taste or even be toxic. Therefore the control of their presence in a plant product is desirable.

Phenolics such as polyphenolics, lignin or tannins, the group of flavonoids, isofavonoids, o-diphenolics, are compounds present in plant material and may be causing quality problems such as reduced protein bioavailability, off colour or taste in processed plant material. Current processes within the field typically only focus on individual contaminants or undesirable components. Thus, current processes commonly fail to account for other components than the component of interest and there is a need to provide better processes considering more than a single contaminant component.

Moreover, current protein products from plants exhibit a number of drawbacks. One major drawback is that the recovery of protein from the plant raw materials is commonly carried out on an industrial scale by heat coagulation. Due to the presently applied heat coagulation processes the protein becomes denatured and as a consequence it loses functional properties, i.e. emulsifying capacity, foaming capacity, thermogelling capacity, water binding capacity, etc. Even the most essential requirement for its application in the food industry, i.e. solubility in water, can barely be met by heat denatured proteins.

WO2008/049385 describes a process for producing coagulated leguminous protein fractions. These are produced from fruit juice of the legumes, which is generated by squeezing relevant plant sections, especially fruits, or by liquid/liquid extraction of milled plant parts. The method of WO2008/049385 comprises from one process step to increase precipitation conditions, which may comprise heat coagulation of the proteins, i.e. at a temperature between 50 and 85° C., in the fruit juice, or precipitation of the proteins from the fruit juice at acidic pH, i.e. 2 to 7, with 5-7 being preferred. In particular, a target protein fraction is isolated by adjusting to a pH value which is suitable for precipitation together with a thermal precipitation of the supernatant of the previous step; a pH value is selected around the isoelectric point of the protein, in combination with a temperature increase above room temperature. WO2008/049385 lists negative substances, the removal of which is considered relevant. These comprise trypsin inhibitors, phytic acid, lectins and other enzyme inhibitors, digestion inhibitors, tannins/tannic acid, protease inhibitors, polyphenols and special sugars such as legume sugars. However, data provided in WO2008/049385 only concerns the protein profile of the product, and little support is provided relating to the negative nutritional components.

US2008/226810 discloses a pea protein composition with a high protein content with a characteristic molecular weight distribution profile and a characteristic soluble protein content. The composition may be produced in a process comprising preparing a flour by grinding dry peas, suspending the pea flour in water, fractionating the suspension to isolate a protein-rich fraction, isolating a protein component of this fraction by a thermal flocculation technique at the isoelectric point of the proteins, i.e. about 4.5, and at a temperature ranging from 40 to 70° C.

The pea protein compositions of US2008/226810 are characterised only with respect to protein components, and other negatively nutritional components are not considered.

WO2008/144939 describes a process of aqueous protein extraction from Brassicaceae oilseed meal. The process may include an aqueous extraction of a Brassicaceae oilseed meal at a pH of from 2.5 to 5.0 at a temperature in the range of 40 to 60° C. As for US2008/226810, the products of WO2008/144939 are concerned with the protein profile and non-protein components are not considered.

U.S. Pat. No. 4,697,004 describes a soy protein isolate with a reduced aluminium content and which is free of phytic acid and phytate complexes. This isolate is prepared from a soy protein raw material, such as defatted soy flour or defatted soy flakes in a process involving forming an aqueous solution of soy protein at an alkaline pH from the soy protein containing raw material. For example, the pH may be of 8 to 10 and the temperature above 65° C. Thereafter, the temperature is reduced rapidly to 25 to 65° C., and the slurry maintained at this temperature to continue extraction of the soy protein from the raw material. The insoluble fraction with phytates and carbohydrates is separated from the solubilised protein fraction by filtration or centrifugation. These temperature ranges are considered optimal values for dissociation of the soluble soy protein from the phytic acid complex and for maintaining the phytates and phytic acid derivatives substantially insoluble. According to U.S. Pat. No. 4,697,004 low pH will results in the formation of a bond between the phytate and the protein.

EP 1528068 relates to a method for producing an isolated-soy protein comprising the step of acid-washing defatted soybeans with an aqueous medium in a region of pH 3.0 to 5.0 to extract and remove whey components. The washing temperature may be from 10 to 60° C. which is considered a range of temperature at which protein is not denatured; the most preferred temperature range is 40 to 50° C. In an exemplary embodiment of EP 1528068 low-denatured defatted soybean flake is resuspended in water at 45° C. followed by adjustment of the pH to 4.2 with hydrochloric acid.

EP 1323353 provides a method for producing a fractionated soybean protein. The method comprises warming a solution containing a soybean protein to a temperature of 30 to 75° C. under a weakly acidic pH of 3.8 to 6.8. The method may further comprise decomposing phytate by a phytase during the manufacturing process. The preferred pH of 4.2 to 6.2 encompasses the isoelectric point of the protein, e.g. 4.5 to 5.3, and the method of EP 1323353 is thus an isoelectric precipitation.

There is therefore an interest in providing improved processes capable of producing plant products of increased nutritional value. The challenge of obtaining such plant products has not been fully addressed. In particular, there is a need for a process capable of an efficient and simple method of fractionating a plant material to separate nutritionally valuable components from components of negative nutritional value. It is especially of interest to provide processes capable of accounting for, and reducing the content of, more than a single contaminant component, and likewise there is a need for a process capable of handling both protein and non-protein components.

The present invention addresses these points.

DISCLOSURE OF THE INVENTION

The present invention relates to a process for the manufacture of a product from a plant material comprising the steps of:

process for the manufacture of a product from a plant material comprising the steps of:
  providing a disrupted plant material comprising <10% (w/w) starch and <10% (w/w) oil/lipids;
  adjusting the pH of the disrupted plant material to a value of pH 3.5 or below to provide an acidic suspension;
  heating the acidic suspension to a temperature in the range of about 50° C. to about 80° C.;
  isolating the product from the heated, acidic suspension.

The present inventors have found that when a plant material containing less than 10% starch and less than 10% lipids is subjected to a treatment comprising lowering of the pH to below pH 3.5, such as the range of about 1.0 to about 3.5, e.g. to about 2.0, while increasing the temperature by heating the plant material to be in the range of about 50° C. to about 80° C., preferably about 60° C. to about 80° C., the solubility of protein in the plant material increases compared to it when the plant material is extracted at increased temperatures without lowering the pH or when the plant material is extracted at a lowered pH without increasing the temperature. Thus, for example the present inventors have surprisingly found that when a plant material is extracted at 65° C. after adjusting the pH to 2.0 an amount of protein is extracted corresponding to 107% of the amount of protein extracted at pH 7.0 at ambient temperature. In comparison, extraction from the pH-adjusted material, e.g. a pH of 2.0, at ambient temperature yields less protein, 96%, and extraction at increased temperature, 65° C., from plant material at pH 7.0 also yields less protein, 98%, compared to the reference extraction at ambient temperature and pH 7.0.

The results indicate that both heat and low pH change the protein structure in a way that results in a decrease in the protein solubility. Surprisingly, however, combining the effects of both heat and low pH result in changed protein structures resulting in increased protein solubility. Without being bound by theory it is believed that some large proteins, e.g. above 100 kDa molecular weight, may dissociate into smaller subunits, of e.g. about 10 to about 30 kDa in size. Such subunits are expected to be of higher solubility and this effect may therefore help explain the advantageous effect.

Furthermore, the combination of low pH and high temperature has also been found to have a beneficial effect on the interaction between non-protein components, e.g. phytate, phenolics, saponins etc., and protein components in the material. In particular, it has been found that the interactions between phytate and protein are hindered allowing easier separation of the two components. Likewise, the interactions between proteins and other non-protein components, e.g. alkaloids, glycoalkaloids, saponins, phenolics and soluble fibres, etc., have also been found to be modified by the combined effect of low pH and high temperature, so that protein may easily be separated from these. Furthermore, hindering the interactions between phytate and protein allows that phytate is recovered from the plant material, and the degradation of the phytate, e.g. by present phytase enzymes, is thus prevented. The method advantageously provides a product from the plant material which is lowered in phytate content, and in particular the addition of a phytase enzyme is less needed in the process to provide a product which is low in phytate content. In a specific embodiment no phytase enzyme is added in the process. Likewise, since the interactions between phytate and protein are avoided it is also possible to recover phytate from the plant material, and phytate can be recovered without requiring addition of a phytase enzyme inhibitor in the process. In a specific embodiment of the process no phytase inhibitor is added.

High temperature and low pH may further, reversibly or irreversibly, inhibit various enzymes of a plant material. Some enzymes, such as polyphenol oxidases, participate in reactions causing undesirable enzymatic discolouration or browning and their inhibition may advantageously prevent browning of plant products.

The method used to adjust the pH is not limited to any particular principle. Any acid may be used. For example the acid may be an inorganic acid, such as sulphuric acid, hydrochloric acid or phosphoric acid, or the acid may be organic, such as citric acid or acetic acid. It is also possible to combine different inorganic acids or organic acids or to use combinations thereof, for example sulphuric acid and citric acid may be used in combination. The acid may be added at a final, desired concentration or the acid may be added in a concentrated form to an aqueous suspension of the plant material. For example, 1 M sulphuric acid may be added to an aqueous suspension of a plant material in a volume sufficient to adjust the pH as desired, or the dry material may be suspended in e.g. 20 to 25 mM citric acid supplemented with sulphuric acid, e.g. at about 50 mM concentration. The acid may also be added in the form of a buffer, or the conditions may be buffered once the acid has been added in order to maintain the pH at the desired value. It is furthermore also preferred that the acid used for adjusting the pH is compatible with applications for foods and beverages for human consumption or with applications for animal feed.

When the acid is also capable of serving as a chelating agent, e.g. citric acid, oxalic acid, lactic acid, malic acid, maleonic acid, tartaric acid, succinic acid, the combination of low pH and the chelating effect may further serve to prevent discolouration of the plant material caused by enzymes, such as polyphenol oxidases, or discolouration occurring non-enzymatically.

Addition of acid may also be accompanied with addition of a further volume of another liquid, e.g. water, or the acid may be added in the desired final concentration. When the plant material for processing exists as a dry material, e.g. in the form of a powder, flakes, granules, etc., the material may be suspended in water prior to addition of acid. The plant material is typically suspended at about 50 g/L to about 500 g/L. Some plant materials, e.g. fruit juices or the like, may already be in an appropriate liquid form and addition of acid, e.g. in a concentrated form, such as 1 M sulphuric acid, may be sufficient to adjust the pH as desired.

The process of the invention may be used with any plant material. However, it is especially advantageous with plant materials derived from legumes. Some plants, e.g. some legumes like soy and lupine, contain large amounts of lipids, typically up to about 20% of the dry weight, and the lipid content of the plant material must then be reduced prior to processing according to the invention. The plant material to be processed according to the present invention must be reduced to comprise no more than 10% (w/w) lipids or oil. Processes for removing lipids from, or "defatting", legumes and other plants with high lipid contents are well known in the art.

Likewise, the content of starch in the plant material to be processed must be below 10% (w/w). Starch is a mixture of amylose and amylopectin; these are both complex carbohydrate polymers of glucose. Starch is often found in the fruit, seeds, rhizomes or tubers of plants. Starch is a fibre which is insoluble in cold water but which swells upon increase of the temperature, so that its presence above 10% (w/w) will be detrimental to the processing. Plants with high contents of starch must therefore have the starch content reduced. Removal of starch is well known in the art.

Some plants may have inherent contents of lipids and starch already below the required limit and may thus not need any processing prior to subjecting to the method of the invention. In general, removal of the shell from e.g. leguminous plants such as soy, lupin, horse bean and pea may increase the protein yield and the purity.

It is preferred that the plant material has been disrupted prior to treating with the combination of low pH and high temperature. Alternatively, a step to disrupt the plant material may also be comprised in the method of the invention, in particular when the plant material inherently has less than 10% (w/w) starch and lipids. Disruption of the plant material will increase the specific surface area available for extraction of components of the plant material, so that extraction will proceed more efficiently and faster. Likewise, the contents, such as protein and non-protein components, of a disrupted plant material are heated faster than plant materials with lower specific surface areas.

The process of the invention may have an impact on several components in a plant material and their subsequent separation from each other. In particular, the process of the invention advantageously allows that protein and non-protein components may be more easily separated from each other after the initial treatment at high temperature and low pH. For example, the initial processing minimises interactions between protein and non-protein components, such as phytate, saponins, alkaloids, glycoalkaloids, and soluble fibres etc. The product manufactured in the process may therefore be a protein product or a non-protein product. Protein products comprise protein isolates, protein concentrates, purified protein components and so forth. A protein product may have any desired purity and the water content may also be controlled as desired. Protein products prepared according to the process advantageously have lowered contents of non-protein components. Thus for example, the relative amount of a non-protein component to protein will be lower than in the starting plant material. The product produced in the process may also be a non-protein product. For example, the product may be a fibre product, e.g. a product of soluble or insoluble fibres, e.g. dietary fibres, or the product may be phenolics, phytate, alkaloids, heteroaromatics or glycoalkaloids etc.

The treatment of a plant material with low pH and high temperature according to the invention may advantageously be included as an initial process step in various processes for the production of plant materials. In another embodiment the process further comprises subjecting the heated, acidic suspension to a solid-liquid separation to provide an acid precipitated fraction and an acid soluble liquid fraction.

isolating the product from the acid precipitated fraction or from the acid soluble liquid fraction.

The acid precipitated fraction will comprise the majority of the insoluble fibres from the plant material. Depending on the conditions and unit operation employed to separate the acid precipitated fraction and the acid soluble liquid fraction a product enriched in insoluble fibres, e.g. an insoluble fibre product, may be obtained. In particular, the insoluble fibres will not be solubilised under the acidic conditions in the initial processing steps, and the insoluble fibres tend to follow the precipitated fractions. The insoluble fibres may be removed, selectively, using solid-liquid separation unit operations for removing coarse materials, such as sieving or filtering through coarse filters or using centrifugation with low centrifugal force or by a combination thereof, e.g. using centrifugal sieving or using a peeler centrifuge. In one embodiment the heated, acidic suspension is subjected to sieving in order to primarily separate the insoluble fibres from the remaining components thus providing a product enriched in insoluble fibres. In a specific embodiment several solid-liquid separation steps are employed in series before other unit operations are used to separate components from each other. For example, after adjusting the pH of the plant material and heating it, the heated, acidic suspension may be subjected to a sieving operation to remove coarse material, such as insoluble fibres, followed by a filtration or centrifugation to remove finer material, such as protein precipitates. This allows provision of a fraction with enriched insoluble fibres and a fraction with enriched protein and reduced insoluble fibres and other non-protein components from the respective solid-liquid operations.

The heated, acidic suspension may also be subjected to homogenisation, e.g. wet milling or the like. Homogenisation may be performed before or after or between any solid-liquid separation operation(s). Some soluble carbohydrate fibres, e.g. pectin, tend to swell upon heating and acidification, and therefore a homogenisation may advantageously increase the extraction of protein and non-protein components and thus provide an increased yield. Moreover, homogenisation may advantageously decrease the viscosity of the suspension. Likewise, a homogenisation operation may be included after any step in the processes. For example, when a precipitate is re-suspended or resolubilised it may appropriately also be homogenised to improve resuspension or resolubilisation.

In addition to insoluble fibres, the acid precipitated fraction will typically comprise protein and a reduced relative amount of non-protein components over the starting material. In one embodiment the insoluble fibres have been removed prior to subsequent processing of the acid precipitated fraction. This acid precipitated fraction may be a product in itself, e.g. a "protein isolate" or the acid precipitated fraction may also be treated further, and in another embodiment the process further comprises suspending the acid precipitated fraction in a liquid and adjusting the pH to a value above pH 4.9, such as from about 7.0 to about 12.0 to provide an alkaline suspension;

subjecting the alkaline suspension to a solid-liquid separation to provide an alkaline precipitated fraction and an alkaline soluble liquid fraction;

isolating the product from the alkaline precipitated fraction or from the alkaline soluble liquid fraction.

A product may be isolated from the alkaline precipitated fraction, and as for the acid precipitated fraction, the alkaline precipitated fraction will typically comprise fibrous material with a reduced relative amount of other non-protein components and protein over the starting material. This product may also be referred to as a "fibre isolate". Any base may be used to increase the pH, but the base is preferably compatible with those used in food products.

Either of the liquid phases, e.g. the heated, acidic suspension, the acid soluble liquid fraction, or the alkaline soluble liquid fraction may be processed further. Thus, in one embodiment the process further comprises adjusting the pH of the heated, acidic suspension or the acid soluble liquid fraction or the alkaline soluble liquid fraction to a value from about 4.0 to about 6.0 to provide a neutral suspension.

The heated, acidic suspension or the acid soluble liquid fraction or the alkaline soluble liquid fraction may be concentrated prior to pH adjustment by any given concentration method as e.g. evaporation or filtration.

Likewise, the step of adjusting the pH to a value of about 4.0 to about 6.0 may also be applied to the alkaline suspension. The solid fractions of the previous steps, i.e. the acid precipitated fraction or the alkaline precipitated fraction may also be subjected to this step. In all cases the step will provide a neutral suspension. In a preferred embodiment the pH is adjusted to a value close to the average isoelectric points of the proteins in the plant material; for legumes, such as soy, peas, beans or the like, the pH is adjusted to about 4.7. Other preferred ranges are from about 4.5 to about 5.0. Acids and bases for adjusting the pH are as described above.

Subsequent to adjusting the pH a product may be isolated from the neutral suspension. In one embodiment the neutral suspension may be subjected to a solid-liquid separation to provide a neutral precipitate and a neutral supernatant, and the product may be isolated from either of these. The neutral precipitate may also be referred to in general terms as a protein isolate; this protein isolate will, as for the protein isolates prepared from the acid precipitated fraction or the alkaline precipitated fraction comprise protein and a reduced relative amount of non-protein components over the starting material.

For the protein isolates prepared according to the above processes in the various precipitation operations, the content of non-protein components, such as phytate, phenolics, saponins, alkaloids, glycoalkaloids, will advantageously be reduced over the starting material. Such non-protein components tend to stay in solution, or possibly suspension, in the liquid fractions. Therefore, their content will be reduced in the precipitated fractions. In general the proteins precipitated in each step will mainly be proteins of low solubility at the pH employed in the previous step, e.g. the acid precipitated fraction will comprise proteins of low solubility at low pH and the alkaline precipitated fraction will comprise proteins of low solubility at high pH; in general, however, most of the protein can be precipitated from the neutral suspension, i.e. in the neutral precipitate, e.g. at a pH close to the isoelectric points of the bulk protein of the plant material, if a step to adjust the pH to a value from about 4.0 to about 6.0 is included in the process. The protein contents of the precipitates may be at least 70% (w/w), such as at least 80% (w/w) or at least 90% (w/w). In a preferred embodiment where the insoluble fibres have been separated a protein isolate of at least 90% (w/w) is provided. Other major components may be insoluble fibres and salts. All of the protein isolates prepared according to the invention have reduced contents of non-protein components, such as phytate, phenolics, saponins, alkaloids, heteroaromatics, glycoalkaloids and oligosaccharides. They may therefore be used to prepare animal feed or food of increased value.

The embodiments disclosed above may comprise solid-liquid separation unit operations. In general according to the invention a solid-liquid separation step may be included at any stage where a liquid contains a solid material. For example, the starting material comprises solids, and following the adjustments of pH values solid materials may be formed in suspension. In general, any solid-liquid separation may be employed. It is preferred that the solid-liquid separation operation is chosen to selectively remove a component of interest. For example, insoluble fibres may be removed using sieving whereas protein precipitates generally require stronger separation power. Following sedimentation of protein from the plant material, the protein component may be isolated using any solid-liquid separation principle. Specific embodiments further employ addition of flocculating agents and/or filter aids prior to or during the solid-liquid separation. Exemplary filter aids comprise starch, e.g. potato starch, plant fibres or plant protein, or a combination thereof.

The protein isolates may be further processed following the solid liquid operations. In one embodiment, the separated protein is subsequently dried.

In other embodiments of the present invention any liquid phase, i.e. suspensions or supernatants from solid liquid operations, may be subjected to further operations to obtain products with particularly desired characteristics, such as purity or further reduction of non-protein components. Isolation of protein may also take place using ultrafiltration, e.g. via 100 kDa cut-off membranes to isolate high molecular weight proteins (optionally together with high-molecular weight sugars, primarily pectins), followed by separation via finer membranes (e.g. 75, 50, 25, 10 and/or 3 kDa) to isolate protein from low molecular weight compounds, such as oligosaccharides, phytate, saponin etc.

Thus, according to an embodiment the process of the invention further comprises optionally adjusting the pH of the alkaline or heated, acidic suspension, or the acid or the alkaline soluble liquid fraction or the neutral suspension or the neutral supernatant to a value from about 3.0 to about 4.0;

contacting the alkaline or heated acidic suspension, or the acid or the alkaline soluble liquid fraction or the neutral suspension or the neutral supernatant with a cation-exchange chromatography resin to separate a cationic binding fraction from a cationic non-binding fraction.

The pH of the material to be contacted with the cation-exchange resin may be adjusted to adjust the cationic binding properties of components in the material. Thus, by adjusting the pH to a value from about 3.0 to about 4.0, e.g. to about 3.5, it can be ensured that a large proportion of proteins present will bind as cations to the negative charges of the cation-exchange resin. The material bound to the cation-exchange resin is referred to as the "the cationic binding fraction" regardless of the condition under which the suspension or liquid fraction is contacted with the cation-exchange resin. However, if purification of a specific component from the material is desired, the material may be contacted with the cation-exchange resin at a higher pH. Phytate and saponins will generally be negatively charged and will not bind to the cation-exchange resin, i.e. they will be present in the cationic non-binding fraction. Likewise, soluble fibres will generally not be charged, and thus they are also cationic non-binding.

Any cation-exchange resin is appropriate for the present invention, and in this context a cation-exchange membrane is also considered relevant for the invention.

Following contacting of the cation-exchange resin with the plant material, the cation-exchange resin may be contacted with an eluent solution to elute the product from the cationic binding fraction from the cation-exchange chromatography resin. Elution conditions from the cation-exchange resin may be any appropriate condition, and such appropriate conditions are well known to the skilled person. In one embodiment, the eluent solution has a pH higher, e.g. about 8.0, than the pH of the liquid fraction or suspension contacted with the cation-exchange chromatography resin. This will bring cationic bound components to an uncharged or anionic stage, so that they will be repelled by the negative charges on, and thereby eluted from, the cation-exchange chromatography resin. In other embodiments, the eluent solution has an increased salt, e.g. NaCl, concentration. The eluate may be subjected to further processing steps, e.g. steps to reduce the volume, desalting, concentrating steps, drying operations and so forth, as desired. The eluate will generally comprise at least 90 protein % (w/w) protein, such as at least 95 protein % (w/w) protein or even about 99 protein % (w/w) protein with the balance generally being represented by ash; this product may be referred to as a "protein isolate" or a "protein concentrate". The protein isolate will generally be significantly reduced in non-protein components, such as phytate, phenolics, saponins, alkaloids, heteroaromatics, glycoalkaloids, and soluble fibres; in one embodiment the product is reduced in phytate below the detection level of the measurement method used.

The cationic non-binding fraction, or run through, from the step of contacting the suspension or liquid fraction with the cation-exchange chromatography resin will generally account for the non-protein components, such as phytate, phenolics, saponins, alkaloids, heteroaromatics, glycoalkaloids, and soluble fibres. However, this run through may also be subjected to further processing steps, and another embodiment also comprises the isolation of the product from the cationic non-binding fraction. These further processing steps may be ultrafiltration or nanofiltration—e.g. at a cut-off of 100 kDa to 10 kDa or even 1 kDa to separate high-molecular weight pectins from the pool of low molecular weight compounds. In its simplest form this embodiment involves concentration and drying of the cationic non-binding fraction. However, the process may further comprise optionally adjusting the pH of the cationic non-binding fraction to a value from about 7.0 to about 9.0;

contacting the cationic non-binding fraction with an anion-exchange chromatography resin to separate an anionic binding fraction from an anionic non-binding fraction.

The cationic non-binding fraction will comprise a significant amount of the phytate and saponins and also the soluble fibres. Phytate and saponins will likely be negatively charged and thereby found in the anionic binding fraction. Various non-protein components, such as soluble fibres and, depending on matrix, pH, and emulsifying properties, also some alkaloids and glycoalkaloids may be found in the anionic non-binding fraction. The anionic binding fraction may be eluted using any appropriate eluent solution, and such are well known within the art. These may comprise elution at low pH or high salt concentration. However, as the anionic binding fraction is generally not proteinaceous the eluent solution may also advantageously comprise organic solvents. As for the cation-exchange resin, "anion-exchange resin" is not considered limiting and anion-exchange membranes are also considered relevant.

Certain embodiments of the invention provide integrated processes for processing a plant material employing the above processes in an integrated set-up. An integrated process may comprise any combination of the above processes, but need not comprise all the above processes; the exact processes for a given set-up will depend on the starting material and the components of interest contained in the starting material. In the integrated process set-up, each of the above processes will typically yield a fraction comprising a component of interest for that specific process and another fraction, which may be used as a starting material in another process described above.

The invention also relates to the products obtainable in the disclosed embodiments of the process of the invention. Thus, in one aspect the invention relates to a protein isolate or protein concentrate with a reduced relative content of non-protein components. In particular, the invention relates to a protein isolate or protein concentrate with a reduced relative content of phytate. In another aspect, the invention relates to a protein isolate with a reduced relative content of saponins. A further aspect relates to a product of a non-protein component with a reduced relative content of protein, e.g. a phytate product with a reduced relative content of protein, a saponin product with a reduced relative content of protein, an alkaloid or a glycoalkaloid product with a reduced relative content of protein. Likewise, a product of soluble fibres and carbohydrates like raffinose family oligosaccharides with a reduced relative content of protein and/or other non-protein components is also considered within the scope of the invention.

BRIEF DESCRIPTION OF THE FIGURES

In the following the invention will be explained in greater detail with the aid of examples of embodiments and with reference to the schematic drawings, in which.

DETAILED DESCRIPTION OF THE INVENTION

Figure 1:
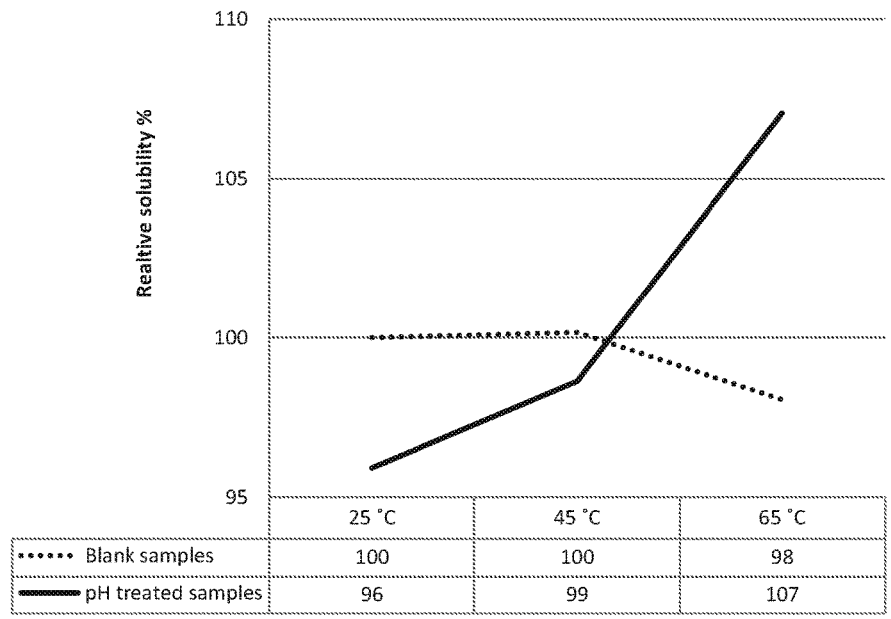
FIG. 1 shows the effect of high temperature and low pH on extraction of protein.

The present invention relates to a process for the manufacture of a product from a plant material comprising the steps of:
process for the manufacture of a product from a plant material comprising the steps of:
providing a disrupted plant material comprising <10% (w/w) starch and <10% (w/w) oil/lipids;
adjusting the pH of the disrupted plant material to a value of pH 3.5 or below to provide an acidic suspension;
heating the acidic suspension to a temperature in the range of about 50° C. to about 80° C.;
isolating the product from the heated, acidic suspension.

In the context of the present invention, the term "plant material" refers to any plant material, and it may refer to whole plants, certain parts of plants, such as fruits, leaves, stems, roots, tubers, nuts, berries etc., or any mixtures of these. In general, the plant material will be subjected to some degree of disruptive processing prior to subjecting to the methods of the inventions. This disruptive processing (or "disruption" or derived forms of this term) may be any processing intended to reduce the size of parts or particles of the plant material, and typical disruptive processing involves cutting, pressing, chopping, milling, grinding, crushing, grating, shredding etc. In particular the disruption aims to degrade or disrupt the cell walls of the plant material to make the contents of the cells accessible. The terms plant material and disrupted plant material may also refer to any liquid produced in the disruptive processing, and the term "plant material" may thus refer to any whole plant, any part of a plant, a solid or liquid material obtained during disruptive processing or a mixture of these.

The content of starch in the plant material to be processed must be below 10% (w/w). It is preferred that the starch content is lower than this, e.g. below 8% (w/w), below 6% (w/w) or below 5% (w/w). Likewise the content of lipids and/or oils must be below 10% (w/w). As for the starch content it is preferred that the oil/lipid content is even lower, than this, e.g. below 8% (w/w), below 6% (w/w) or below 5% (w/w).

The present invention is not limited to a specific plant or group of plants, and material from any plant is relevant to the invention. However, legumes are a preferred source of plant material. Legumes, i.e. plants of the family Fabaceae (or Leguminosae), commonly have dry fruits in pods; the fruits have high contents of proteins and lipids. Common legumes include alfalfa, clover, peas, beans, lentils, lupins, mesquite, carob, soy, and peanuts. More specifically legumes include dry beans (*Phaseolus* spp. including several species now in *Vigna*), such as kidney bean, haricot bean, pinto bean, navy bean (*Phaseolus vulgaris*), lima bean, butter bean (*Phaseolus lunatus*), azuki bean, adzuki bean (*Vigna angularis*), mung bean, golden gram, green gram (*Vigna radiata*), black gram, urad (*Vigna mungo*), scarlet runner bean (*Phaseolus coccineus*), ricebean (*Vigna umbellata*), moth bean (*Vigna acontifolia*), tepary bean (*Phaseolus acutifolius*); dry broad beans (*Vicia faba*), such as horse bean (*Vicia faba equina*), broad bean (*Vicia faba*), field bean (*Vicia faba*); dry peas (*Pisum* spp.), such as garden pea (*Pisum sativum* var. *sativum*), protein pea (*Pisum sativum* var. *arvense*); chickpea (*Cicer arietinum*), dry cowpea (*Vigna unguiculata*), pigeon pea (*Cajanus cajan*), lentil (*Lens culinaris*), peanut (*Arachis hypogaea*), lupins (*Lupinus* spp.), soy (Glycine max).

Some legumes of particular interest comprise soy, lupine, *faba* beans (or broad bean) and peas.

Lupine has the same general composition as soy bean, but the saponin content is very low. Before processing the hull fraction can be removed. This increases the protein concentration of the protein concentrates. Lupines contain oil in concentrations from a few percent up to around 15% (W/W) depending on the specific species. Some of the species can be processed directly whereas the high oil containing species may need to be defatted before processing. Lupines also contain toxic alkaloids that may be removed. Sweet lupine species has reduced content of these alkaloids and are preferred over bitter species. The alkaloid compounds will generally be present in the eluate after cation exchange chromatography where they can be eluted in a specific fraction by a skilled person or in the soluble carbohydrate fraction after cation- and anion exchange chromatography. They can be removed from this fraction by ultra- or nanofiltration or by adsorption to a hydrophobic material such as hydrophobic column materials. They can also be removed by use of activated carbon.

*Faba* bean or broad bean contains starch instead of lipids/oil. This must be reduced to 10% (w/w) or less prior to heating, and removal of the hull fraction is also advantageous. This can e.g. be performed by wind sieving after milling, or the starch (and hull fraction) can be removed by wet fractionation before heating e.g. by centric sieves or decanters. *Faba* beans or broad beans may also contain too high concentrations of heteroaromatics acting as toxic compounds such as vicine and convicine. In addition some *faba* bean phenolics/tannins can create nutritional problems when present in food and feed. Species with low concentration of these compounds have been developed and are preferred for the process of the present invention.

Pea contains both starch and high concentrations of saponins. Starch and hulls can be removed as described for the *faba* beans and lupine seeds, whereas the saponins are (partly) removed by the process in general and are isolated in the anionic binding fraction in the elution from the anion-exchange resin.

Some legumes contain large proteins, e.g. soy contains glycinin and conglycinin of about 400 kDa molecular weight, that are known to create immunological response in calves. The present inventors have now found that the combined effect the acidic pH and high temperature may dissociate these into their constituent subunits and thereby reduce their antigenecity. Thus, the invention provides a further beneficial effect in an animal feed for calves prepared using a protein product of the invention.

Without being bound by theory it is believed that a combined effect of the increased temperature and the decreased pH may be that large proteins, e.g. proteins of molecular weight above 100 kDa, such as above 200 or 300 kDa, e.g. proteins of about 400 kDa molecular weight, are dissociated to units of about 10 to about 30 kDa in size. This in turn may explain the increase in solubility of protein.

In certain embodiments the plant material is derived from potatoes, and the process is also adaptable for potato protein purification, also in relation to starch production. Homogenisation and acid treatment are durable on the whole potatoes, and starch can be removed by a combination of centrifugal sieves and decanters. The patatin protein fraction is to a minor extent precipitating in the acidic pH range, but due to partial glycosylation the precipitate is relatively difficult to isolate in the native form. Traditionally isolation of the patatin protein fraction is performed at very low pH by addition of high concentration of sulphuric acid followed by high temperature treatment (>80° C.). This creates a denatured protein with low solubility and loss of the water binding capacity, foaming capability and other characteristics. The process of the present invention reduces the denaturing effects on the patatin proteins and preserves to a greater extent the physico-chemical properties of the patatin proteins.

In potatoes glycoalkaloids are present, and these toxic compounds will generally be extracted from the potato matrix along with the proteins. The glycoalkaloids may bind cationic to the cation exchange resin together with the proteins that are not precipitated. Separation of the glycoalkaloids from the cationic bound protein fraction can be performed by use of a controlled pH elution of the cation exchanger.

Potatoes also contain phenolic compounds that may create colouring of the protein and fibre compounds. This is primary chlorogenic acid and caffeic acid. These compounds bind anionic to the anion exchange resin if used and they can be isolated by controlled pH elution from this resin.

Plant material is a complex mixture of soluble and insoluble material comprising proteins and non-protein components, such as carbohydrates, e.g. starch, pectin, cellulose and hemicellulose, minerals and other organic components, such phytate, glycoalkaloides, alkaloids, flavour components, simple organic acids, etc., and monomeric and polymeric reactive phenols.

Phytate is the hexaorthomonophosphate ester of myo-inositol and it may occur as a calcium magnesium salt, phytin. In the context of the present invention the words "phytate" and "phytic acid" may be used interchangeably. In particular, the exact form of phytate will depend on the surrounding pH so that phytate may be changed to phytic acid and phytic acid to phytate simply by adjusting the pH. Phytate has a strong binding affinity to important minerals such as calcium, magnesium, iron, and zinc. When a mineral binds to phytate, it becomes insoluble and will be nonabsorbable in the intestines, and it may thus reduce the bioavailability of various minerals, such as zinc, magnesium, calcium, iron, etc. Removal of phytate and its derivatives and alternative forms is desirable because phytate phosphorous is not readily available to humans or animals and it interferes with the absorption of cations, such as zinc, magnesium, calcium, iron.

The content of phytate in plant materials may be up to about 5% of the dry weight or higher. In legumes the content of phytate is typically from about 0.5% to about 2.5% of the dry weight.

Other components of typical plant materials are soluble and insoluble fibres. Insoluble fibres are often relatively easily collected by e.g. gravity/sedimentation and are subsequently used as either fertiliser/soil conditioner or as animal feed. The majority of these fibres are derived from cell wall material. However, these insoluble fibres could potentially become a valuable product for use in the food industry, provided that simple methods were provided enabling extraction of such fibres preferably without components of negative nutritional value, such as alkaloids, glycoalkaloids, phytate, phenolics, inhibitors of digestive enzymes. Such fibre products could potentially have widespread applications within the food industry as an inexpensive additive with the ability to improve the nutritional and/or digestive qualities of food products and/or to function as a bulking agent and/or as a replacement for other constituents such as e.g. sugar, sugar alcohols, and/or fat.

Soluble fibres may be desirable to remove from a protein product, e.g. a protein isolate or concentrate, to be used to prepare an animal feed. However, soluble fibres may themselves constitute a potentially commercially interesting component from plant materials. Soluble fibres can be used as e.g. a sugar replacement agent. Soluble fibres of current commercial interest comprise e.g. fructans, inulin, oligofructose, polydextrose, indigestible dextrins, etc. Due to the solubility in water, these products find widespread use in the food industry, in particular as a low calorie sugar substitute in combination with e.g. high intensity sweeteners. Soluble fibres can also be used to improve the nutritional qualities of various food products.

The methods of the present invention comprise a step to adjust the pH of the plant material to a value of from about 1.0 to about 3.5. In the context of the present invention this range is generally referred to as "low pH" or "acidic pH". Other pH ranges relevant to the process of the present invention are values such as from about 1.5 to about 3.0 or about 1.5 to about 2.5, e.g. about 1.5 to about 2.0 or about 2.0 to about 2.5. The pH adjustment may be performed prior to or after heating the plant material, or the two steps may be performed simultaneously. Likewise, the pH adjustment may be performed simultaneously with or after the disruption of the plant material, if this step is also performed. The pH may be adjusted by adding any acid as is appropriate depending on the plant material and the component of interest in the process. It is also possible to adjust the pH using a buffer. The acid should preferably be compatible with food applications, and it may be inorganic or organic. Preferred inorganic acids are sulphuric acid, hydrochloric acid or phosphoric acid.

In some embodiments the acid also has a chelating effect and it may in combination with the low pH prevent discolouration of the plant material caused by contact with oxygen, such as enzymatic oxidation caused by polyphenol oxidase or non-enzymatic discolouration. Combinations of pH-values and concentrations of chelating acids for preventing discolouration are found in WO 2010/006621, which is hereby incorporated by reference. In particular, relevant pH-ranges are found on page 13 of WO 2010/006621 A1 and relevant concentrations of the chelating agents on page 12 of WO 2010/006621 A1. The contents of these pages are hereby included by reference.

The pH-range of about 1.0 to about 3.5 may also be referred to in the context of the present invention as "acidic". In parallel with this definition, the pH-range from about 4 to about 8 is referred to as "neutral", and the pH-range above 8, e.g. from 8-14 is referred to as "alkaline" or "basic". Likewise, these terms may be used to describe specific fractions occurring in the different process steps of the invention.

When a base is required it should preferably be compatible with food applications. Relevant bases are hydroxides of alkali metals, e.g. NaOH, KOH, ammonia, or $Ca(OH)_2$. Basic conditions may also be provided using a buffer.

Any method of heating the plant material is appropriate in the process of the present invention as long as the temperature of the plant material can reach a value in the range of about 50° C. to about 80° C. In the context of the invention, this range is generally referred to as "high" temperature. In specific embodiments of the invention the plant material is heated to a temperature at or above about 55° C., about 60° C., about 65° C., or about 70° C. or about 75° C. In a preferred embodiment, the plant material is in a dry form without any added liquid, and the acid is heated before mixing with the plant material so that the plant material is brought to the temperature of the heated acid. This will ensure that the plant material is heated fast within the time to mix the plant material with the liquid, such as within 5 minutes or less, e.g. within 3 minutes or within 1 minute. In order to ensure that the plant material is heated efficiently the volume of liquid added will be such that the plant material constitutes no more than half the total mass, e.g. the plant material is suspended at about 50 g/L to about 500 g/L, such as about 100 g/L to about 300 g/L, e.g. about 100 g/L or about 200 g/L. Alternatively, the plant material may be suspended in water at the desired temperature and the pH may be adjusted by adding acid to the desired pH. It is furthermore also possible to suspend the plant material in liquid, i.e. water or acid, and subsequently increase the temperature using external heating means. Regardless of how the heating is initially provided the process of the invention may involve further auxiliary heating means to maintain the temperature as desired once the plant material has been mixed with a heated liquid or once it has been heated externally.

The duration of the acid treatment is not limiting to the invention. Once the pH of the plant material has been adjusted to the desired value it can be retained at this value until a subsequent procedural step requires a change in the pH or until solid and liquid material are separated in a solid-liquid separation. However, it is also possible to adjust the pH, e.g. to increase it, before lowering the temperature.

The duration of the period the plant material is maintained at the increased temperature should be sufficient to ensure that the effect of the combined low pH and high temperature sets in. This will generally occur after about 1 minute. However, in some embodiments the high temperature is maintained for about 5 minutes or for about 10 minutes. In other embodiments the time it takes to handle the liquids and bring them to the next procedural step is considered sufficient. In yet other embodiments, the plant material is subjected to homogenisation after heating the plant material, preferably after adding a liquid at high temperature to the plant material. For example, the plant material may be homogenised for about 1 second, about 1 minute, e.g. about 2 minutes, about 5 minutes or for about 10 minutes before isolating a product from the heated, acidic suspension.

Some embodiments of the invention comprise solid-liquid separation steps to separate solids from liquids in a liquid suspension. In general, any solid-liquid separation unit operation may be employed, although it is preferred that the solid-liquid separation operation is chosen based on the nature of, especially, the solids to be removed. For example, coarse material, such as insoluble fibres, may be separated from a suspension using a sieve or screen with a mesh size of e.g. about 500 µm, about 250 µm, about 125 µm, about 100 µm or about 80 µm. This will allow selective separation of insoluble fibres while retaining most protein precipitates in suspension.

Sedimented protein components may be isolated by filtration. Filtration may be performed through any commercially available filter material, and it may be performed in any type of filtration operation, such as the types known as vacuum filtration, pressure filtration, cross-flow filtration, basket centrifugation, deep bed filtration, etc. The protein component may also be isolated using centrifugation, e.g. in a solid bowl centrifuge, tubular bowl centrifuge, decanter centrifuge, disk-stack centrifuge etc.

Certain embodiments of the present invention involve cation- and anion-exchange resins. Any unit operation for contacting a liquid material with a chromatography resin is appropriate for these aspects of the invention. For example, the plant material may be contacted with the cation-exchange chromatography resin in a stirred tank reactor, or in a packed or expanded bed column. Depending on the nature of the unit operation used in the contacting step the plant material may be clarified, such as by screening, filtration or centrifugation, prior to applying the plant material to the cation- or anion-exchange unit operation or to other unit operations. The plant material may further be concentrated prior to applying the plant material to the cation- or anion-exchange unit operation or to other unit operations. In either aspect, it may be relevant to adjust the pH of the plant material prior to contacting with the cation-exchange chromatography resin. For example, the pH may be further adjusted to a value from about 2.0 to about 3.5. Such adjustment may be provided by the addition of an acid or base, e.g. $H_2SO_4$ or NaOH, respectively, as appropriate, or by addition of a buffer. Ion-exchange membranes are also relevant for the present invention.

The ion-exchange resins may be contacted with an eluent solution to eluate ionic bound components. For the cation-exchange resin, the eluent solution may have a higher pH, a higher ionic strength or a combination of a higher pH and a higher ionic strength than material contacted with the resin. It is preferred to use an eluent solution with a higher pH than the pH of the suspension or liquid fraction contacted with the chromatography resin. The eluent solution for the anion-exchange chromatography resin follows the same principles as relevant for anion-exchange. Thus, it may contain a lower pH than the material contacted with the resin, or the salt concentration may be increased. It is also possible for the eluent solution to elute anionic bound components to contain an organic solvent. For example the eluent solution may be 0.5 M formic acid in 50% ethanol.

However, in certain embodiments the cationic or anionic bound components are further fractionated by contacting the cation- or anion-exchange chromatography resins, respectively, with bound material with gradually changing elution conditions, for example for the cationic bound material by first contacting the resin with a first eluent solution of a higher pH than the material contacted with the resin, then with another eluent solution of a higher pH than the first eluent solution. The cation-exchange chromatography resin may then be contacted with yet another eluent solution. The same considerations apply for the anion-exchange chromatography resin. The changes from binding material, or an optional washing solution, to the series of eluent solutions may take place in a step-wise fashion, or the conditions may be changed gradually in a so-called gradient-type elution.

Protein isolates or concentrates produced in a process according to the invention may also be subjected to further steps to remove traces of non-protein components or to concentrate the product. For example, the process may also further comprise a concentrating step capable of removing water from a liquid suspension; a preferred concentrating step is ultrafiltration. Suitable ultrafiltration membranes are those with cut-off values of 100 kDa, 20 kDa, 15 kDa, 10 kDa, 8 kDa, 5 kDa or even finer membranes depending on the specific application. Other methods such as e.g. diafiltration or nanofiltration may also be employed.

Liquid may also be removed from a liquid suspension using other appropriate methods, such as a solid-liquid separation method, e.g. centrifugation or filtration, or the liquid may be removed from a suspension, e.g. by evaporation, vacuum evaporation, freeze drying, spin flash drying, spray drying, floating bed drying or the like. It is also possible to combine several of these principles to obtain a product in a dry form.

The invention will now be explained in the following non-limiting examples. As will be evident to the skilled person variations are possible without deviating from the invention.

EXAMPLES

1. Effect of Temperature and pH on Protein Solubility 2.5 gram white flake soybean meal was mixed with 25.00 mL 20 mM phosphate buffer at pH 7.0. Extraction was performed by shaking for 10 min. at room temperature followed by centrifugation for 15 min at 2350×g.

750 µL supernatant were transferred to Eppendorf tubes and the pH was reduced to 2.0 by addition of 37.5 µL 1 M $H_2SO_4$ to the sample tubes. Reference samples were added 37.5 µL milli-Q water. After mixing the samples were placed on a heating block for 10 min. before pH adjustment to pH 7.0 by addition of 75 µL 1 M NaOH. Reference samples were added 70 µL milli-Q water. The samples were centrifuged and protein content in the supernatants was measured by UV spectrophotometry at 280 nm.

Protein solubility (estimated as concentration of soluble protein) as a function of pH adjustment and heat treatment (25° C., 45° C. and 65° C.) were calculated relative to the protein solubility of the reference sample (25° C. without pH adjustments). The results are shown in FIG. 1.

Heat treatment without pH adjustment has no effect on protein solubility up to 45° C. At higher temperatures the protein solubility decreases slightly and a heat treatment at 65° C. results in a 2% reduction of the protein concentration.

At room temperature low pH treatment results in decreased protein solubility at pH 7.0 of 4% compared to the blank sample. Increasing the temperature during low pH treatment results in an increased protein solubility at pH 7.0, and heat treatments at temperatures above approximately 50° C. results in higher protein solubility than the reference samples. Heat treatment at 65° C. during low pH treatment thus result in a 7% increased protein solubility compared to the reference sample (25° C.) and an approximately 10% increase in protein solubility compared to the 65° C. heat treated reference sample.

The results indicate that both heat and low pH are capable of changing the protein structure in a way that results in a decrease in the protein solubility, but combining the denaturing effects of both heat and low pH results in a different kind of protein solubilisation resulting in increased protein solubility.

2. Production of Protein Concentrates in Laboratory Scale

Figure 2:
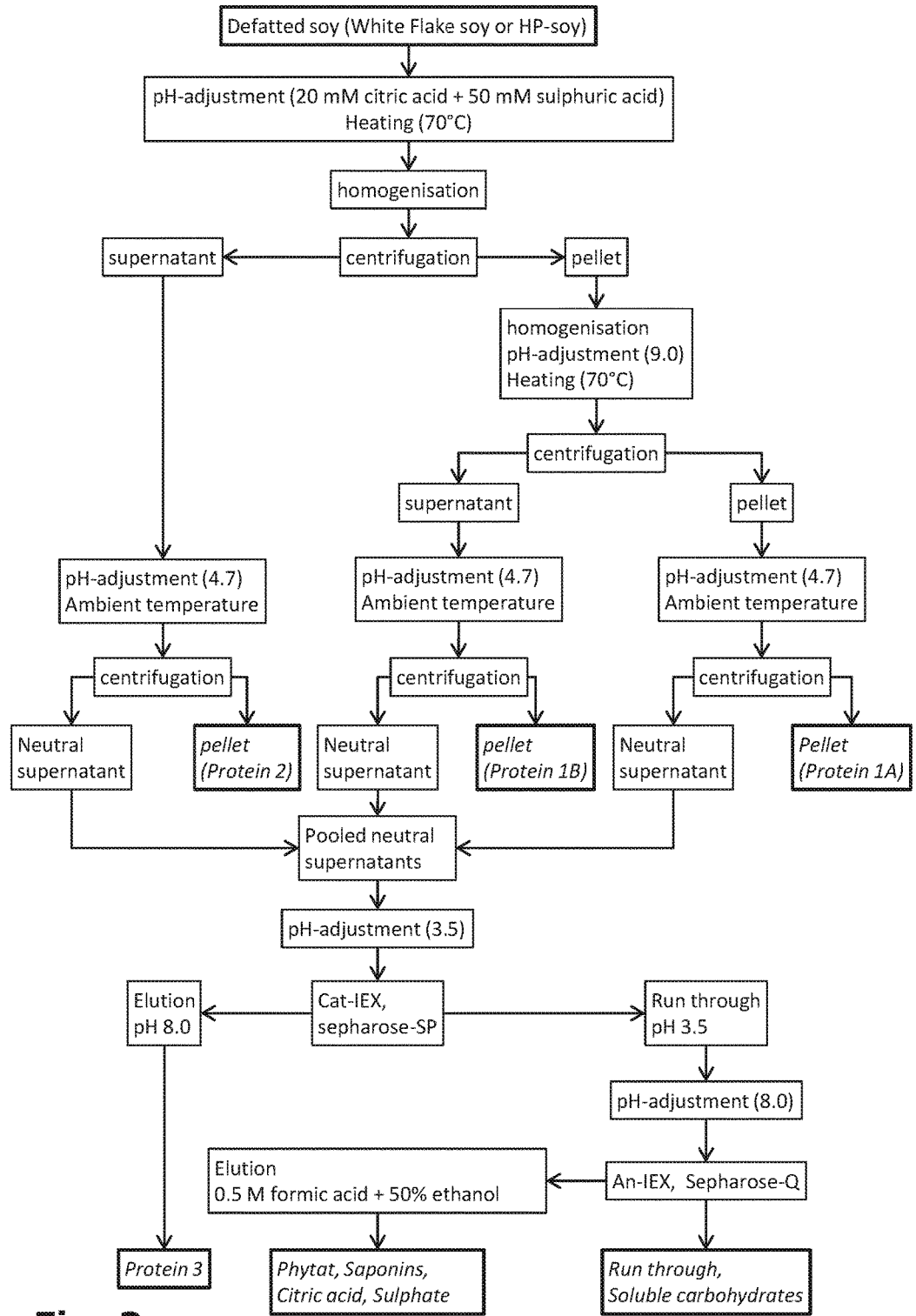
FIG. 2 shows a process diagram of an embodiment of the invention.

Production of Proteins, Insoluble Dietary Fibre Fraction, Soluble Dietary Fibre Fraction and Soy Anions by the Full Process in Laboratory Scale FIG. 2 illustrates a laboratory scale embodiment of the invention. The major unit operations are shown in FIG. 2, however, certain details as evident from the text below are not included in the figure. The various unit operations employed in the example may be varied and the specific unit operations easily replaced with other unit operations known within the art. Such variations will be within the understanding of the skilled person.

50.0 g gram starting material (HP-soy: defatted and toasted soy or WF-soy: defatted soy) were pre-heated to 70° C. followed by addition of 250 mL hot (70° C.) acid solution A (20 mM citric acid+50 mM sulphuric acid). The sample was homogenised by ultra turrax for 1 min. at 6500 rpm followed by centrifugation at 1700×g for 2 min. The supernatant was decanted and the pellet was submitted to further two extractions using similar conditions as above but only 200 mL hot acid solution A. The three acidic supernatants were pooled and stored at room temperature.

The pellet was added 200 mL hot (70° C.) 50 mM NaOH solution and homogenised by ultra turrax (6500 rpm for 1 min.). The pH was adjusted to 9.0±0.2 with 1 M HCl and the sample was centrifuged (1700×g for 2 min.). The alkaline supernatant was decanted and the pellet was submitted to further two extractions using similar conditions as above using 200 mL hot (70° C.) water. The three alkaline and water supernatants were pooled and stored at room temperature.

The pellet was added 200 mL acidic solution A and pH was adjusted to 4.7±0.2 using 1 M NaOH. The suspension was centrifuged (1700×g for 2 min). The neutral supernatant was stored at room temperature for further purification and the pellet (Protein 1A) was frozen (−20° C.) and lyofilised.

The acid soluble proteins were precipitated from the acidic supernatants by adjusting the pH to 4.7±0.2 with 1 M NaOH and the solution was centrifuged (1700×g; 2 min). The pellet (acid soluble and neutral precipitated protein; Protein 2) was frozen and lyophilised. The supernatant was pooled with the neutral supernatant.

The alkaline soluble proteins were precipitated from the alkaline supernatants by adjusting the pH to 4.7±0.2 with 1 M sulphuric acid and the solution was centrifuged (1700×g; 2 min). The pellet (alkaline soluble and neutral precipitated protein; Protein 16) was frozen and lyophilised. The supernatant was pooled with the neutral supernatant.

The pH of the neutral supernatant was adjusted to 3.5±0.2 and submitted to cation-exchange chromatography using a 100 mL column (Amersham SP sepharose FF (Fastflow) on H+ form). Unbound material was eluted by use of 20 mM acetate pH 3.5. The run through fraction was collected and stored for further purification. Elution of bound compounds was performed by use of 150 mL linear gradient (from 20 mM acetate pH 3.5 to 20 mM phosphate pH 8.2). Eluted proteins (neutral non-precipitated protein; Protein 3) were collected and pooled before freezing and lyophilisation.

The pH of the run through fraction after cation exchange chromatography was adjusted to 8.0±0.2 and submitted to anion exchange chromatography using a 100 mL column (Amersham Q sepharose FF on acetate form). Unbound material was eluted by use of 10 mM phosphate pH 8.0. The run through fraction was collected, frozen and lyophilised (neutral non-protein constituents (Soluble carbohydrates). Elution of bound compounds was performed by use of 150 mL 0.5 M formic acid in 50% ethanol. The eluted fraction was dried by evaporation.

0.5-1 gram sample (Protein 1A, Protein 16 and Protein 2) was heated at 550° C. for 4 hours. Ash content was measured gravimetrically. The ash was quantitatively transferred into 50 mL flasks by use of 5 mL milli-Q water and 5.00 mL concentrated hydrochloric acid. The samples were heated in boiling water for 10 min prior to filtering (Frisenette AGF 165-50 mm) and quantitatively transferred into 100 mL measuring flasks by use of 5×1 mL milli-Q water. The flasks were added 10.0 mL 2 M KOH prior to filling with milli-Q water.

100 µL of each sample was transferred to a 50 mL measuring flask and 20 mL milli-Q water was added along with 5.00 mL phosphate reagents consisting of 1.7 g ascorbic acid in 300 mL ammonium molybdate solution (12.8 gram ammonium molybdate, 0.3 gram potassium timoyltartrate, 158 mL concentrated sulphuric acid and water op to 2000 mL). The flask was filled with milli-Q water and mixed. The absorbance was measured spectrophotometrically after 15 min. at 890 nm. Phytate content was calculated from the total content of phosphate (P) by use of a phosphate standard.

TABLE 1

Gravimetric yield (% of start mass) as well as product composition (% of dry matter).

| | Gravimetric yield % | Protein % | IDF % | SDF % | Sucrose % | Ash % |
|---|---|---|---|---|---|---|
| HP products | | | | | | |
| Protein 1A | 54 | 57 | 39 | 0 | 0 | 4 |
| Protein 1B | 10 | 91 | 2 | 0 | 0 | 7 |
| Protein 2 | 7 | 73 | 21 | 0 | 0 | 6 |
| Protein 3 | 5 | 96 | 0 | 0 | 0 | 4 |
| Soluble carbohydrates | 13 | 0 | 0 | 54 | 44 | 2 |
| WF products | | | | | | |
| Protein 1A | 16 | 47 | 45 | 0 | 0 | 8 |
| Protein 1B | 30 | 81 | 13 | 0 | 0 | 6 |
| Protein 2 | 20 | 83 | 13 | 0 | 0 | 5 |
| Protein 3 | 7 | 96 | 0 | 0 | 0 | 4 |
| Soluble carbohydrates | 14 | 0 | 0 | 50 | 48 | 2 |

Protein determination based on % N * 6.25;
IDF = insoluble dietary fibres;
SDF = soluble dietary fibres

TABLE 2

Concentration of phytate in protein concentrates. FIGS. are calculated as the highest possible concentration based on total phosphate in the samples. Results are given in % relative to the concentration found in WF starting material. The recovery (%) is relative to the content found in WF starting material.

| | Phytate concentration[1] % | Recovery[2] % |
|---|---|---|
| HP products | | |
| Protein 1A | 22 | 12 |
| Protein 1B | 35 | 3 |
| Protein 2 | 65 | 5 |
| Protein 3 | 0 | 0 |
| Soluble carbohydrates | 0 | 0 |
| WF products | | |
| Protein 1A | 17 | 3 |
| Protein 1B | 65 | 19 |
| Protein 2 | 28 | 6 |
| Protein 3 | 0 | 0 |
| Soluble carbohydrates | 0 | 0 |

[1]Estimate based on total P in sample relative to P in WF starting material
[2]Recovery relative to content in WF starting material The mass balances for the processing of WF-soy and HP soy are provided in Tables 3 and 4

TABLE 3

Mass balance for lab-scale processing of HP-soy

| Fraction | Gravimetric yield | Protein | IDF | SDF | Sucrose | Phytate recovery |
|---|---|---|---|---|---|---|
| Start | 100 | | | | | |
| Protein 1A | 54 | 30.8 | 21.1 | 0 | 0 | 12 |
| Protein 1B | 10 | 9.1 | 0.2 | 0 | 0 | 3 |
| Protein 2 | 7 | 5.1 | 1.5 | 0 | 0 | 5 |
| Protein 3 | 5 | 4.8 | 0 | 0 | 0 | 0 |
| Soluble carbohydrates | 13 | 0 | 0 | 7.0 | 5.7 | 0 |
| Subtotal | | 49.8 | 22.8 | 7.0 | 5.7 | 20 |
| Total | 89 | 85.3 | | | | |

TABLE 4

Mass balance for lab-scale processing of WF-soy

| Fraction | Gravimetric yield | Protein | IDF | SDF | Sucrose | Phytate recovery |
|---|---|---|---|---|---|---|
| Start | 100 | | | | | |
| Protein 1A | 16 | 7.5 | 7.2 | 0 | 0 | 3 |
| Protein 1B | 30 | 24.3 | 3.9 | 0 | 0 | 19 |
| Protein 2 | 20 | 16.6 | 2.6 | 0 | 0 | 6 |
| Protein 3 | 7 | 6.7 | 0 | 0 | 0 | 0 |
| Soluble carbohydrates | 14 | 0 | 0 | 7 | 6.7 | 0 |
| Subtotal | | 55.1 | 13.7 | 7 | 6.7 | 28 |
| Total | 87 | 82.5 | | | | |

As seen from the mass balances in Tables 3 and 4 all protein fractions were reduced in phytate content over the starting material. In particular only about 20 to about 30 percent of the phytate was accounted for in the protein fractions. The majority of the phytate was present in the eluate from the anion-exchange step. This fraction would also contain the saponins and anions, such as citrate and sulphate used in the process.

Figure 3:
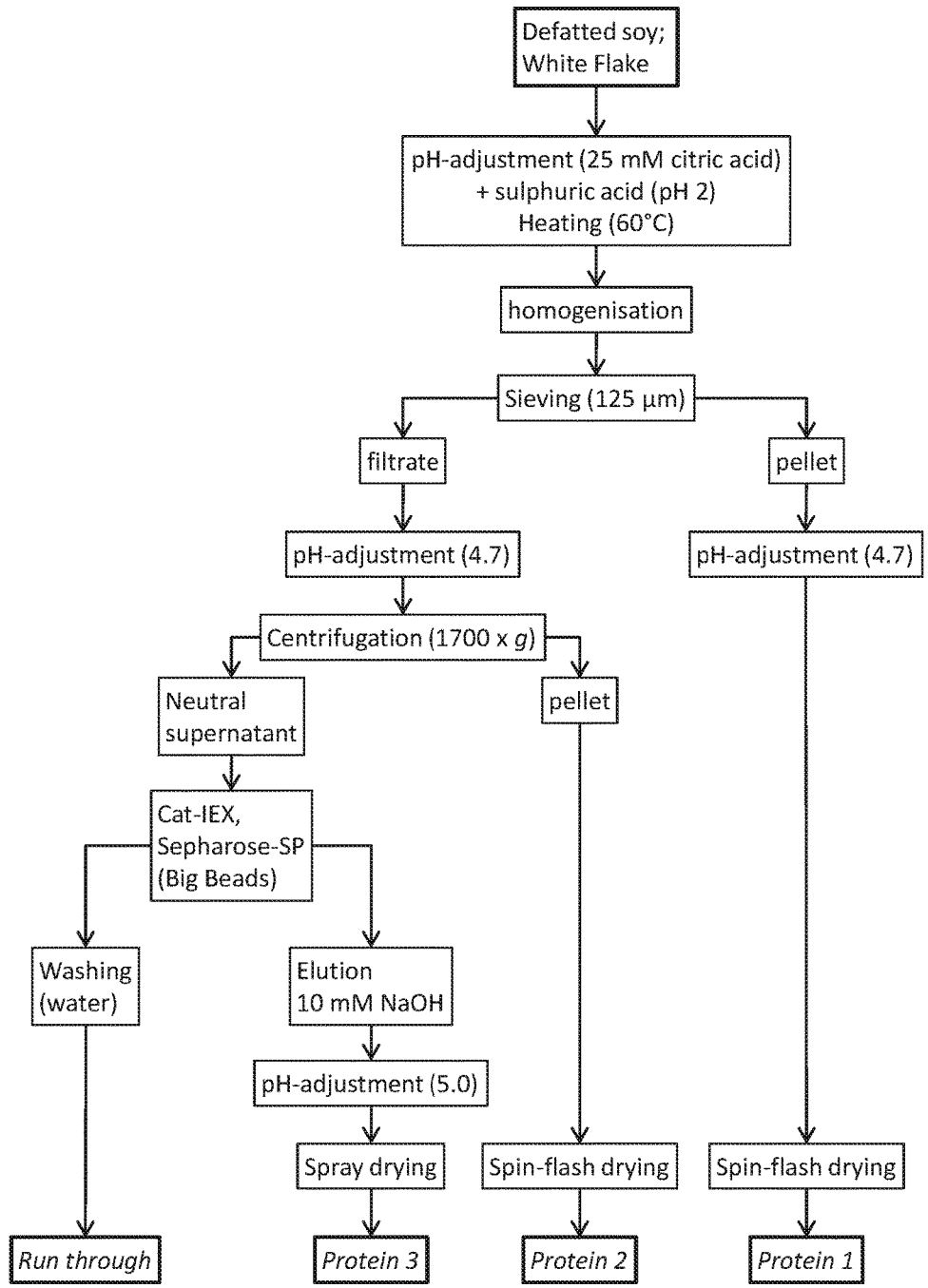
FIG. 3 shows a process diagram of an embodiment of the invention.

3. Production of Protein Concentrates in Pilot Scale 3.1. Production of Soy Protein Concentrates and Isolates from White Flake Soy in Pilot Scale FIG. 3 illustrates a pilot scale embodiment of the invention. The major unit operations are shown in FIG. 3, however, certain details as evident from the text below are not included in the figure. The various unit operations employed in the example may be varied and the specific unit operations easily replaced with other unit operations known within the art. Such variations will be within the understanding of the skilled person.

15.0 kg defatted soybean flakes (white flakes; WF-soy) was added 75 L hot (60° C.) 25 mM citric acid and pH was adjusted to 2.0±0.2 with sulphuric acid. The suspension was homogenised by a fryma mill (0.25 mm). The homogenate was drained in a centrifugal sieve (ø 25 cm; pore 125 µm). The undissolved material was washed by re-suspending the filter cake with 2 times 50 L hot (60° C.) water followed by homogenisation and draining as described above. The filter cake was finally re-suspended in water and pH was adjusted to 4.7±0.2 with sodium hydroxide prior to draining in the centrifugal sieve and drying by use of spin flash dryer (Protein 1).

The filtrates from the centrifugal sieve were pooled and pH was adjusted to 4.7±0.2 with sodium hydroxide. The solution was stored at 4° C. overnight. The clear upper fraction was decanted and the precipitate was purified by two times centrifugation at 1700×g for 3 min. with intermediate re-suspension in water (1:1 V/V). The decanted clear soluble phase and the supernatants were pooled. The pellet was thereafter dried by use of spin flash dryer (Protein 2).

The soluble phase was submitted to cation exchange chromatography using SP-Sepharose BB (Big Beads) column material (GE Healthcare, Denmark). Unbound material was flushed out of the column using water (Run through) while the bound material was eluted by use of 10 mM sodium hydroxide. The protein elution profile was monitored by UV detection at 280 nm. Eluted proteins were pooled and pH adjusted to 5.0±0.2 prior to spray drying (Protein 3).

TABLE 5

Gravimetric yield (% of start mass) as well as product composition (% of dry matter).

| | Gravimetric yield % | Protein % | IDF % | SDF % | Sucrose % | Ash % |
|---|---|---|---|---|---|---|
| Protein 1 | 40 | 71 | 23 | 0 | 0 | 6 |
| Protein 2 | 30 | 95 | 3 | 0 | 0 | 2 |
| Protein 3 | 4 | 99 | 0 | 0 | 0 | 1 |
| Run through | 27 | 0 | 0 | 50 | 48 | 2 |

Figure 4:
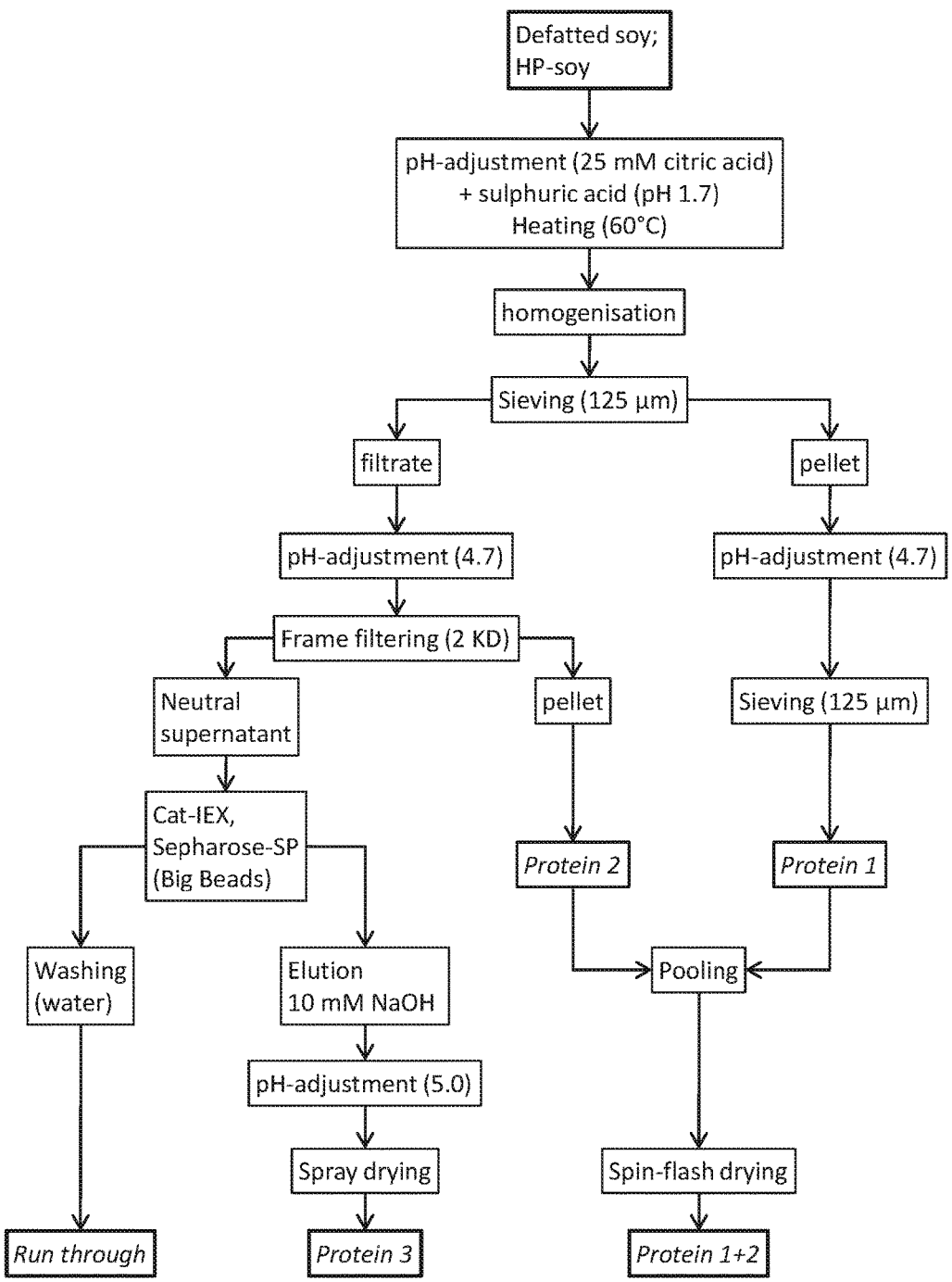
FIG. 4 shows a process diagram of an embodiment of the invention.

Protein determination based on % N * 6.25;
IDF = insoluble dietary fibres;
SDF = soluble dietary fibres 3.2. Production of Soy Protein Concentrates and Isolates from HP-Soy in Pilot Scale FIG. 4 illustrates a pilot scale embodiment of the invention. The major unit operations are shown in FIG. 4, however, certain details as evident from the text below are not included in the figure. The various unit operations employed in the example may be varied and the specific unit operations easily replaced with other unit operations known within the art. Such variations will be within the understanding of the skilled person.

15.0 kg de-fatted and toasted soybean flakes (HP-soy) was added 75 L hot (60° C.) 25 mM citric acid and pH was adjusted to 1.7±0.2 with sulphuric acid. The suspension was homogenised by a fryma mill (0.25 mm). The homogenate was drained in a centrifugal sieve (ø 25 cm; pore 125 µm). The un-dissolved material was washed by re-suspending the cake with 2 times 50 L hot (60° C.) water followed by homogenisation and draining as described above. The filter cake was finally re-suspended in water and pH was adjusted to 4.7±0.2 with sodium hydroxide prior to draining in the centrifugal sieve (Protein 1).

The filtrates from the centrifugal sieve were pooled and pH was adjusted to 4.7±0.2 with sodium hydroxide. The solution was stored at 4° C. overnight. The clear upper fraction was decanted and the precipitate was purified by two times frame filtering (BECO-KD7 Depth filter sheet) with intermediate re-suspension in water (1:1 V/V). The decanted clear soluble phase and the filtrate were pooled. The filter cake (Protein 2) was pooled with Protein 1 and dried by use of spin flash dryer (Protein 1+2).

The soluble phase was submitted to cation-exchange chromatography using SP-Sepharose BB column material (GE Healthcare, Denmark). Unbound material was flushed out of the column using water (Run through) while the bound material was eluted by use of 10 mM sodium hydroxide. The protein elution profile was monitored by UV detection at 280 nm. Eluted proteins were pooled and pH adjusted to 5.0±0.2 prior to spray drying (Protein 3).

TABLE 6

Gravimetric yield (% of start mass) as well as product composition (% of dry matter).

| | Gravimetric yield % | Protein % | IDF % | SDF % | Sucrose % | Ash % |
|---|---|---|---|---|---|---|
| Protein 1 + 2 | 59 | 67 | 27 | 0 | 0 | 6 |
| Protein 3 | 13 | 99 | 0 | 0 | 0 | 1 |
| Run through | 28 | 0 | 0 | 49 | 49 | 2 |

Protein determination based on % N * 6.25;
IDF = insoluble dietary fibres;
SDF = soluble dietary fibres 3.3. Recovery of Trypsin Inhibitors in Protein Concentrates after Pilot Plant Protein Isolation 0.5 g Protein (WF protein 1, WF protein 2 (section 3.1) and HP protein 1+2 (section 3.1)) is extracted in 2×5 mL 100 mM acetate buffer pH 4.9 for 2×1 min by use of ultra turrax. The extracts are centrifuged (two 3000×g for 2 min.) and the clear supernatants of each protein concentrate is pooled and stored overnight at 4° C. The solutions are re-centrifuged to remove precipitations and the clear supernatants are decanted. The content of trypsin inhibitors are measured by a spectrophotometric assay using porcine trypsin and Na-benzoyl-L-arginine-4-nitroanilid (L-BAPA) as substrate measuring the colour of the hydrolysate at 410 nm. Trypsin activity is defined as the amount of enzyme needed to hydrolyse 1 µmol L-BAPA in 1 min (25° C.; pH 8.2). Trypsin inhibitor unit (TIU) is defined as the amount of inhibitor protein needed to inhibit 1 trypsin unit.

The extract was further analysed for the content of saponins by use of TLC chromatography using silica gel sheets.

TABLE 7

Content of trypsin inhibitors in protein concentrates.
Trypsin inhibitor units (TIU) is defined in the text.

| Protein sample | TIU/g |
|---|---|
| HP products | |
| Start | 0.2 |
| Protein 1 + 2 | 0.1 |
| WF products | |
| Start | 12.4 |
| Protein 1 | 0.4 |
| Protein 2 | 0.6 |

The invention claimed is:

1. A process for the manufacture of a phytate depleted product from a plant material comprising the steps of:
providing a plant material comprising ≥10% (w/w) starch and <10% (w/w) oil/lipids;
disrupting the plant material;
lowering the content of starch in the plant material to <10% (w/w) to provide a starch depleted plant material;
suspending the disrupted, starch depleted plant material in acid at value of pH 3.0 or below preheated to an increased temperature in the range of 60° C. to 80° C. to provide a heated, acidic suspension;
isolating the phytate depleted product from the heated, acidic suspension.

2. The process for the manufacture of a phytate depleted product according to claim 1, wherein the pH is in the range of 1.0 to 2.5.

3. The process for the manufacture of a phytate depleted product according to claim 1, wherein the pH is adjusted with an acid capable of serving as a chelating agent.

4. The process for the manufacture of a phytate depleted product according to claim 1, wherein the acid comprises and acid selected from the group consisting of citric acid, oxalic acid, lactic acid, malic acid, maleonic acid, tartaric acid, succinic acid or a combination thereof.

5. The process for the manufacture of a phytate depleted product according to claim 1, wherein the acidic suspension is buffered.

6. The process for the manufacture of a phytate depleted product according to claim 1, wherein the plant material is derived from a plant selected from the group consisting of *faba* beans, broad beans, peas, potatoes.

7. The process for the manufacture of a phytate depleted product according to claim 1, wherein the plant material is selected from fruit, seeds, rhizomes or tubers of plants, or any combination thereof.

8. The process for the manufacture of a phytate depleted product according to claim 1, wherein the plant material is suspended in liquid at about 50 g/L to about 500 g/L.

9. The process for the manufacture of a phytate depleted product according to claim 1, wherein the duration of the period the plant material is maintained at the increased temperature is from about 1 minute to about 10 minutes.

10. The process for the manufacture of a phytate depleted product according to claim 1, wherein no phytase enzyme or phytase enzyme inhibitor is added.

11. A process for the manufacture of a phytate depleted product according to claim 1, further comprising the steps of:
subjecting the heated, acidic suspension to a solid-liquid separation to provide an acid precipitated fraction;
isolating an insoluble fibre product or a protein isolate product from the acid precipitated fraction.

12. A process for the manufacture of a phytate depleted product according to claim 1, further comprising the steps of:
subjecting the heated, acidic suspension to a solid-liquid separation to provide an acid precipitated fraction;
suspending the acid precipitated fraction in a liquid and adjusting the pH to a value above pH 4.9 to provide an alkaline suspension;
subjecting the alkaline suspension to a solid-liquid separation to provide an alkaline precipitated fraction; and
isolating the phytate depleted product as a fibre isolate product from the alkaline precipitated fraction.

13. A process for the manufacture of a phytate depleted product according to claim 1, further comprising the steps of:
adjusting the pH of the heated, acidic suspension to a value from 4.0 to 6.0 to provide a neutral suspension;
subjecting the neutral suspension to a solid-liquid separation to provide a neutral precipitate;
isolating the phytate depleted product as a protein isolate product from the neutral precipitate.

14. A process for the manufacture of a phytate depleted product according to claim 1, further comprising the steps of:
subjecting the heated, acidic suspension to a solid-liquid separation to provide an acid soluble liquid fraction;
adjusting the pH of the acid soluble liquid fraction to a value from 4.0 to 6.0 to provide a neutral suspension;
subjecting the neutral suspension to a solid-liquid separation to provide a neutral precipitate;
isolating the phytate depleted product as a protein isolate product from the neutral precipitate.

15. A process for the manufacture of a phytate depleted product according to claim 1, further comprising the steps of:
subjecting the heated, acidic suspension to a solid-liquid separation to provide an acid precipitated fraction;
suspending the acid precipitated fraction in a liquid and adjusting the pH to a value above pH 4.9 to provide an alkaline suspension;
subjecting the alkaline suspension to a solid-liquid separation to provide an alkaline soluble liquid fraction;
adjusting the pH of the alkaline soluble liquid fraction to a value from 4.0 to 6.0 to provide a neutral suspension;
subjecting the neutral suspension to a solid-liquid separation to provide a neutral precipitate;
isolating the phytate depleted product as a protein isolate product from the neutral precipitate.

16. A process for the manufacture of a phytate depleted product according to claim 1, further comprising the steps of:
contacting the heated, acidic suspension with a cation-exchange chromatography resin to separate a cationic binding fraction from a cationic non-binding fraction;
contacting the cation-exchange chromatography resin with an eluent solution to elute the phytate depleted product as a protein concentrate product or as a protein isolate product or as a glycoalkaloid product or as an alkaloid product from the cationic binding fraction from the cation-exchange chromatography resin; or
isolating the phytate depleted product as a soluble fibre product, or as a carbohydrate product from the cationic non-binding fraction.

17. A process for the manufacture of a phytate depleted product according to claim 16 further comprising the steps of:
  contacting the cationic non-binding fraction with an anion-exchange chromatography resin to separate an anionic binding fraction from an anionic non-binding fraction;
  contacting the anion-exchange chromatography resin with an eluent solution to elute a phytate product or a saponin product or a phenolic product from the anionic binding fraction from the anion-exchange chromatography resin; or
  isolating the phytate depleted product as a soluble fibre product or as a carbohydrate product or as an alkaloid product or as a glycoalkaloid product from the anionic non-binding fraction.

18. A process for the manufacture of a phytate depleted product according to claim 1, further comprising the steps of:
  subjecting the heated, acidic suspension to a solid-liquid separation to provide an acid precipitated fraction;
  suspending the acid precipitated fraction in a liquid and adjusting the pH to a value above pH 4.9 to provide an alkaline suspension;
  contacting the alkaline suspension with a cation-exchange chromatography resin to separate a cationic binding fraction from a cationic non-binding fraction;
  contacting the cation-exchange chromatography resin with an eluent solution to elute the phytate depleted product as a protein concentrate product or as a protein isolate product or as a glycoalkaloid product or as an alkaloid product from the cationic binding fraction from the cation-exchange chromatography resin; or
  isolating the phytate depleted product as a soluble fibre product, or as a carbohydrate product from the cationic non-binding fraction.

19. A process for the manufacture of a phytate depleted product according to claim 18, further comprising the steps of:
  contacting the cationic non-binding fraction with an anion-exchange chromatography resin to separate an anionic binding fraction from an anionic non-binding fraction;
  contacting the anion-exchange chromatography resin with an eluent solution to elute a phytate product or a saponin product or a phenolic product from the anionic binding fraction from the anion-exchange chromatography resin; or
  isolating the phytate depleted product as a soluble fibre product or as a carbohydrate product or an alkaloid product or as a glycoalkaloid product from the anionic non-binding fraction.

20. A process for the manufacture of a phytate depleted product according to claim 1, further comprising the steps of:
  adjusting the pH of the heated, acidic suspension to a value from 4.0 to 6.0 to provide a neutral suspension;
  contacting the neutral suspension with a cation-exchange chromatography resin to separate a cationic binding fraction from a cationic non-binding fraction;
  contacting the cation-exchange chromatography resin with an eluent solution to elute the phytate depleted product as a protein concentrate product or as a protein isolate product or as a glycoalkaloid product or as an alkaloid product from the cationic binding fraction from the cation-exchange chromatography resin; or
  isolating the phytate depleted product as a soluble fibre product, or as a carbohydrate product from the cationic non-binding fraction.

21. A process for the manufacture of a phytate depleted product according to claim 20, further comprising the steps of:
  contacting the cationic non-binding fraction with an anion-exchange chromatography resin to separate an anionic binding fraction from an anionic non-binding fraction;
  contacting the anion-exchange chromatography resin with an eluent solution to elute a phytate product or a saponin product or a phenolic product from the anionic binding fraction from the anion-exchange chromatography resin; or
  isolating the phytate depleted product as a soluble fibre product or as a carbohydrate product or an alkaloid product or as a glycoalkaloid product from the anionic non-binding fraction.

22. The process for the manufacture of a phytate depleted product according to claim 11, wherein the solid-liquid separation is selected from filtration, or centrifugation or a combination of filtration and centrifugation.

23. The process for the manufacture of a phytate depleted product according to claim 1, wherein the plant material is disrupted in a process selected from the group consisting of cutting, pressing, chopping, milling, grinding, crushing, grating, shredding or combinations thereof.

* * * * *